United States Patent Office 3,460,216
Patented Aug. 12, 1969

3,460,216
AMINOALKYL SILICONE GLASS LUBRICANT
James K. Campbell and Harold A. Clark, Midland, Mich., assignors to Dow Corning Corporation, Midland, Mich., a corporation of Michigan
No Drawing. Filed Oct. 22, 1965, Ser. No. 502,378
Int. Cl. C03b 37/00
U.S. Cl. 28—75
6 Claims

ABSTRACT OF THE DISCLOSURE

A size for glass fibers containing an amino silicone lubricant and an alkaline compound with or without starch and a volatile diluent. The size may be removed from the fiber by heating the fibers to a temperature of at least 200° F.

---

This application relates to a lubricant for siliceous fibers and fabric, particularly those made of glass.

Glass or quartz fibers, upon being extruded from a hot bushing, must be coated with a sizing agent before being wound into yarn. The sizing agent must generally exercise two functions; it must bind the glass fibers of the yarn together, and it must lubricate the glass fibers as they are being wound into yarn in order to avoid breakage of the fibers through abrasion. The size can also be used to lubricate the yarn as it is being wound into roving or woven into fabric.

One common form of size for glass fibers consists of an aqueous dispersion of starch as a binder and a hydrocarbon oil, a glycol, or a fatty amine as a lubricant. These have the advantage of being heat-removable to yield a pure glass fabric or roving.

Other binders such as polyvinylacetate, polyesters, epoxy resins, alkyd resins, and other compositions such as those shown in U.S. Patent 2,688,007, are not satisfactorily removable by heat. They also may have a lubricant added to them.

Lubricants for glass can also be used to prevent strand breakage in glass fabric which is repeatedly flexed.

This application relates to a lubricant for siliceous fibers and fabric consisting essentially of an organopolysiloxane copolymer having a viscosity of no more than 10,000 cs., measured at 25° C., consisting essentially of (1) [(CH$_3$)$_2$SiO] units and
(2) at least one

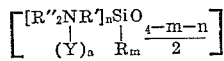

units, where
R is a lower alkyl radical,
R′ is a lower alkylene radical,
R″ is hydrogen, a lower alkyl radical, or an aminoalkyl radical of the formula

where Q is hydrogen or a lower alkyl radical,
Y is an acid of the formula XCOOH, where X is hydrogen or an alkyl radical of no more than 8 carbon atoms,
n has an average value of 1 to 3,
m has an average value of 0 to 2, and
a has an average value of 0 to 1, there being from 4 to 300 times as many (1) units present as (2) units.

These materials shown significant superiority over other silicones such as dimethylpolysiloxane in their performance as glass lubricants. This is believed to be the case because of the presence of amine nitrogen in the lubricants of this invention, which causes them to adhere to the glass.

Generally, the best results are attained by those lubricants of this invention which have an average of from 50 to 450 dimethylsiloxane units per molecule, and by those lubricants which have aminoalkylciloxane endblocks.

R can be any lower alkyl radical such as methyl, ethyl, isopropyl, or isobutyl.

R′ can be any lower alkylene radical such as methylene, dimethylene, or $$-CH_2CHCH_2-$$
$$\quad\quad |$$
$$\quad\quad CH_3$$

R″ can be hydrogen, a lower alkyl radical such as those listed above, or an aminoalkyl radical such as

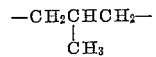

Examples, therefore, of suitable lubricants of this invention are:

(a) 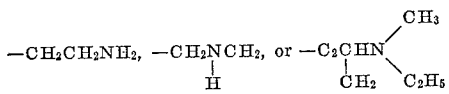

(b) 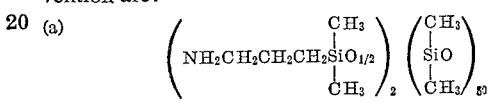

(c) 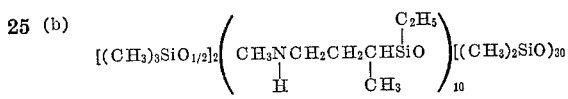

(d) 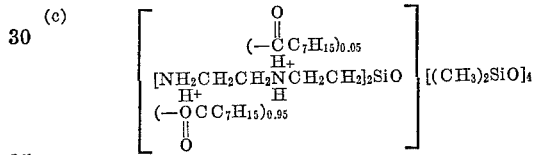

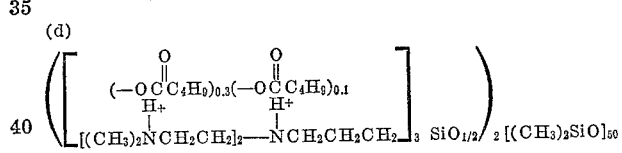

Small amounts of other siloxane units can be included in the lubricant of this invention, e.g. methylsiloxane, phenylsiloxane, and trimethylsiloxane units, without materially affecting the performance thereof, and the presence of such units is not intended to remove the resulting compositions from the scope of the claims below.

The lubricants of this invention can be made by hydrolysis and condensation of the appropriate silanes, for example, by the methods shown in U.S. Patent 2,762,823.

The acidic salts of the aminoalkylpolysiloxanes used in this invention can be prepared merely by adding the proper molar amount of the appropriate acid with stirring.

An added advantage of the lubricants of this invention is that they can be formulated into a size for siliceous fibers which can be removed by heating at temperatures of about 600° F. or above without leaving any significant amount of residue. It has not been previously possible to remove silicone lubricants from glass by heating without leaving a dark, insoluble residue on the glass.

The above invention is a composition, suitable as a finish for siliceous fibers, consisting essentially of (a) 100 parts by weight of an organopolysiloxane copolymer having a viscosity of no more than 10,000 cs. measured at 25° C. consisting essentially of (1)

[(CH$_3$)$_2$SiO]

units and (2) at least one

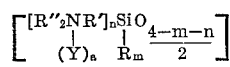

unit, where R is a lower alkyl radical, R' is a lower alkylene radical, R'' is hydrogen, a lower alkyl radical, or an aminoalkyl radical of the formula $$Q_2NR'-\underset{(Y)_a}{|}$$

where Q is hydrogen or a lower alkyl radical, Y is an acid of the formula XCOOH where X is hydrogen or an alkyl radical of no more than 8 carbon atoms, $n$ has an average value of 1 to 3, $m$ has an average value of 0 to 2, and $a$ has an average value of 0 to 1, there being from 4 to 300 times as many (1) units present as (2) units, (b) From 0.05 to 5 parts by weight of an alkali metal compound, an alkaline earth compound, or a quaternary ammonium compound which has a pH of at least 8 when measured as no more than a 0.1 N aqueous solution, (c) From 0 to 4,000 parts of starch, and (d) From 0 to 20,000 parts of a volatile diluent.

The compositions of this invention can be used in the pure form or as emulsions, solutions, or mere dispersions. Water is the preferred volatile diluent, and some of the compositions of this invention are water-soluble, but organic solvents such as benzene, toluene, heptane, cyclohexane, diethyl ketone, cyclohexanone, diethylether, dibutylether, 1,1,1-trichloroethane, diacetone alcohol, beta-methoxyethanol, beta-ethoxyethanol, and isopropanol can also be used, if desired. The amount of volatile diluent present in the compositions of this invention usually ranges from 20 to 99 weight percent.

It can be seen that ingredient (a) is the lubricant of this invention, which has been described in detail above.

Y can be any acid as above defined, e.g., acetic, propionic, butyric, pentanoic, hexanoic, heptanoic, octanoic, or nonoic acids. It should be noted, however, that when Y is acetic or propionic, there should preferably be at least 30 units of (1) for every unit of (2) present in ingredient (a), or the amount of residue remaining after heat-removal of the composition may be undesirably high. Better results in lubricity are also obtained when there are at least 10 units of (1) for every unit of (2) present, and preferably in a ratio of 30 to 1 and over.

Ingredient (b) can be any alkali metal compound of the above description such as lithium hydroxide, sodium carbonate, sodium bicarbonate, sodium borate, tripotassium phosphate, cesium hydroxide, rubidium cyanide, and n-butyl potassium. Ingredient (b) can also be an alkaline earth compound of the same description such as calcium hydroxide, barium hydroxide, calcium carbonate, and magnesium hydroxide, or a quaternary ammonium compound such as tetrabutylammonium hydroxide, triphenylmethylammonium carbonate, decylpropyldimethylammonium hydroxide, benzylallyldimethylammonium hydroxide, and any other alkaline compound containing a $M_4N$ cation, where M is a monovalent hydrocarbon radical. Some of the above alkaline earth compositions are too insoluble to form 0.1 N aqueous solutions, but their saturated aqueous solutions have a pH of over 8; therefore they are operative in this invention.

Sodium bicarbonate is the preferred ingredient (b).

Ingredient (c), the starch ingredient, is the binding agent of the size of this invention. The binding agent is limited to starch because it is the only known binder which is removable by heating at temperatures below about 900° F. without leaving a residue.

It is preferred for the starch used herein to be finely-divided.

Occasionally, a light-colored residue remains on the glass after the size of this invention has been burned off. This residue is usually a residue of ingredient (b), and it is therefore generally removable by water-washing.

It is important for ingredient (a) to contain virtually no silanol groups or hydrolyzable groups such as silicon-bonded alkoxy, acyloxy, or halogen. The absence of such groups can be assured by hydrolyzing any of the above groups and then reacting the remaining silanol groups with hexamethyldisilazane to form trimethylsiloxy groups at the sites of the silanol groups.

The size of this invention can be applied to glass fibers by the standard methods of the industry.

The following examples are illustrative only and should not be construed as limiting the invention, which is properly delineated in the appended claims.

Example 1

Three samples of the reaction product of one molar part of

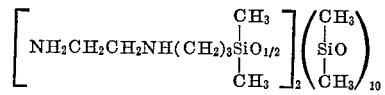

and 2 molar parts of hexanoic acid were prepared by mixing the above two ingredients. To each sample there was added one weight percent of one of the following compounds: sodium carbonate, sodium bicarbonate, and sodium hydroxide.

Two drops of each mixture were placed on porcelain plates and heated for 20 minutes at 900° F. to remove the silicone mixture from the porcelain. There was no residue remaining on the porcelain plate at the point where the mixture containing sodium bicarbonate had been applied. An extremely faint trace of light-colored residue remained where the other two mixtures had been applied.

When any of the above three mixtures are applied to glass fibers, the fibers acquire excellent glass to steel and glass to glass lubricity.

Example 2

Four compositions were formulated from the ingredients shown below. One weight percent of sodium bicarbonate was added to each composition. Each composition was then tested for removability from porcelain by heating as in Example 1.

The formulations and results are shown below:

| Ingredient | Amounts in molar parts—formulation | | | |
|---|---|---|---|---|
| | (a) | (b) | (c) | (d) |
| The aminoalkyl silicone of Example 1 | 1 | 1 | 1 | 1 |
| Formic acid | 2.82 | 3.29 | 3.06 | 2.83 |
| Diethylene glycol ethylene ether | 1.8 | 1.8 | 1.8 | |
| Residue remaining after heating | None | Slight | Slight | Very slight |

Formulations (b), (c), and (d) above were found to be water-soluble, and all formulations provide to be superior sizes for glass fibers when applied to the glass as a 5 weight percent dispersion in water mixed with 5 weight percent of starch.

Example 3

To a 1 molar part of a composition of the formula

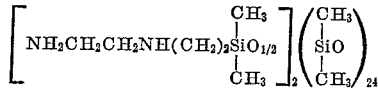

there was added 2 molar parts of hexanoic acid. To this there was added 1 weight percent of sodium bicarbonate.

The composition was tested for removability from porcelain by heating as in Example 1. No residue was found on the porcelain after heating.

Example 4

When 10 grams of

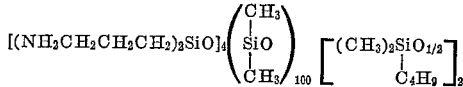

0.01 g. of pentanoic acid, and 0.3 g. of very finely divided calcium hydroxide are dispersed in 100 g. of acetone, the product is a finish for quartz fibers which imparts superior lubricity, yet which is completely removable from the fibers by heating them at 700° F.

Example 5

To two samples, each containing one molar part of

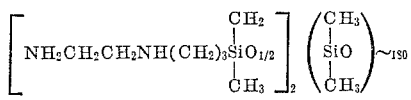

there was added two molar parts of hexanoic acid in the case of one sample, and two molar parts of formic acid in the case of the other.

One weight percent of sodium bicarbonate was added to each sample.

Both samples, when subjected to the heating test of Example 1, were removed from the porcelain plate without leaving any visible residue.

Both samples were dispersed in about 9 times their weight of isopropanol and were applied to samples of glass yarn. The treated, dried yarn showed superior lubricity against glass and steel in both cases, and, when heated at 700° F., the size disappeared from the yarn without leaving a visible residue.

Example 6

When 5 grams of

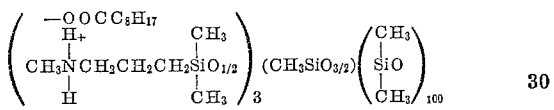

0.1 gram of potassium carbonate, 10 grams of starch, and 200 grams of water are emulsified, the product is a size for glass fibers which imparts superior lubricity to the fibers, and holds the fibers together after their winding into yarn, yet which is completely removable from the fibers by heating them at 650° F.

Example 7

To 1 molar part of a hydroxyl-endblocked dimethylpolysiloxane having an average of about 230 silicon atoms per molecule there was added, in the order stated, 2 molar parts of

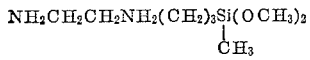

2 molar parts of 90% formic acid solution, based on the formic acid, and, after a brief interval, 2 molar parts of hexamethyldisilazane

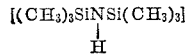

as a capping agent for the residual hydrolyzable groups. The product was a compound of the average formula

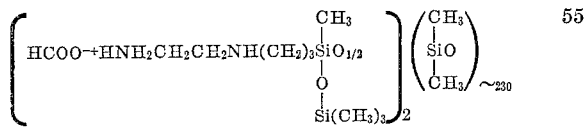

To this was added one weight percent of tetramethylammonium hydroxide.

A sample of this mixture was placed on a porcelain plate and heated for 20 minutes at 900° F. A faint trace of white residue was all that remained on the porcelain plate after the heating.

The above mixture is an excellent size for glass fibers, when used as a 2 weight percent emulsion in a water solution containing 5 weight percent of starch, based on the weight of the water.

That which is claimed is:
1. The method comprising applying to siliceous fibers prior to winding into yarn a size consisting essentially of
   (A) 100 parts by weight of an organopolysiloxane copolymer having a viscosity of no more than 10,000 cs. measured at 25° C. consisting essentially of
      (1) $\{(CH_3)_2SiO\}$ units and
      (2) at least one

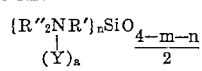

R is a lower alkyl radical,
      R' is a lower alkylene radical,
      R'' is a hydrogen, a lower alkyl radical, or an aminoalkyl radical of the formula

Q is hydrogen or a lower alkyl radical,
      Y is an acid of the formula XCOOH where X is hydrogen or an alkyl radical of no more than 8 carbon atoms,
      $n$ has an average value of 1 to 3,
      $m$ has an average value of 0 to 2, and
      $a$ has an average value of 0 to 1,
         there being from 2 to 300 times as many (1) units present as (2) units,
   (B) from 0.05 to 5 parts by weight of an alkaline compound of the group alkali metal, alkaline earth metal or quaternary ammonium compounds of the group consisting of carbonates, bicarbonates, borates, phosphates, cyanides and hydroxides, (B) having a pH of at least 8 when measured as no more than a 0.1 N aqueous solution,
   (C) from 0 to 4000 parts of starch and
   (D) from 0 to 20,000 parts of a volatile diluent winding said fibers into a yarn and thereafter removing the size by heating the fibers at a temperature of at least 600° F.
2. The method of claim 1 where the organopolysiloxane copolymer consists essentially of

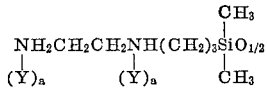

units and dimethylsiloxane units where Y and $a$ are as defined in claim 1.

3. The method or claim 1 where ingredient (B) is sodium bicarbonate.
4. The method of claim 1 where the diluent is water.
5. The method of claim 1 where Y is hexanoic acid.
6. The method of claim 1 where Y is formic acid.

References Cited

UNITED STATES PATENTS

| | | | |
|---|---|---|---|
| 2,256,474 | 9/1941 | Drake | 106—213 |
| 2,663,989 | 12/1953 | Schlatter et al. | 106—213 X |
| 2,762,823 | 9/1956 | Speier | 260—448.2 |
| 3,234,144 | 2/1966 | Morehouse | 252—389 |
| 3,249,535 | 5/1966 | Keil | 252—8.3 |
| 3,303,048 | 2/1967 | Cooper et al. | 117—139.5 X |
| 3,355,424 | 11/1967 | Brown | 117—139.5 X |

HERBERT B. GUYNN, Primary Examiner

U.S. Cl. X.R.

252—8; 65—23, 24; 117—124, 126, 139, 161